(12) United States Patent
Case Myers et al.

(10) Patent No.: US 11,697,451 B2
(45) Date of Patent: Jul. 11, 2023

(54) ELECTRIC POWERED GEAR ASSEMBLY FOR STEERING SYSTEM

(71) Applicant: Steering Solutions IP Holding Corporation, Saginaw, MI (US)

(72) Inventors: Christopher R. Case Myers, Freeland, MI (US); Eric D. Pattok, Frankenmuth, MI (US); Brian J. Magnus, Frankenmuth, MI (US); Travis L. Palmer, Frankenmuth, MI (US); Ryan D. Harris, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/691,223

(22) Filed: Mar. 10, 2022

(65) Prior Publication Data

US 2022/0289272 A1    Sep. 15, 2022

Related U.S. Application Data

(60) Provisional application No. 63/257,677, filed on Oct. 20, 2021, provisional application No. 63/158,986, filed on Mar. 10, 2021.

(51) Int. Cl.
*B62D 5/04* (2006.01)
*F16H 25/22* (2006.01)
*F16H 25/20* (2006.01)

(52) U.S. Cl.
CPC ........... *B62D 5/0448* (2013.01); *B62D 5/043* (2013.01); *B62D 5/0403* (2013.01); *F16H 25/2209* (2013.01); *F16H 2025/2031* (2013.01); *F16H 2025/2046* (2013.01)

(58) Field of Classification Search
CPC ......... F16H 2057/0224; F16H 25/2209; F16H 2025/2046
See application file for complete search history.

(56) References Cited

U.S. PATENT DOCUMENTS 1,650,651 A * 11/1927 Preston ............. B60R 25/02147
70/252
RE20,637 E * 1/1938 Hammond, Jr. et al. ...................
B62D 3/10
74/500

FOREIGN PATENT DOCUMENTS

CN        2881225 Y  *  3/2007
DE   102010050561 A1 *  5/2012  ............... B62D 3/12

OTHER PUBLICATIONS

CN 2881225 Y, Translation (Year: 2007).*

* cited by examiner

*Primary Examiner* — Jake Cook
(74) *Attorney, Agent, or Firm* — Dickinson Wright PLLC

(57) ABSTRACT

An electric powered recirculating ball assembly includes a shaft having a plurality of sector teeth extending therefrom. The assembly also includes an eccentric sleeve defining a bore containing a portion of the shaft, the eccentric sleeve comprising an upper sleeve segment and a lower sleeve segment that are separate components, the eccentric sleeve defining an opening that the sector teeth extend through.

17 Claims, 7 Drawing Sheets

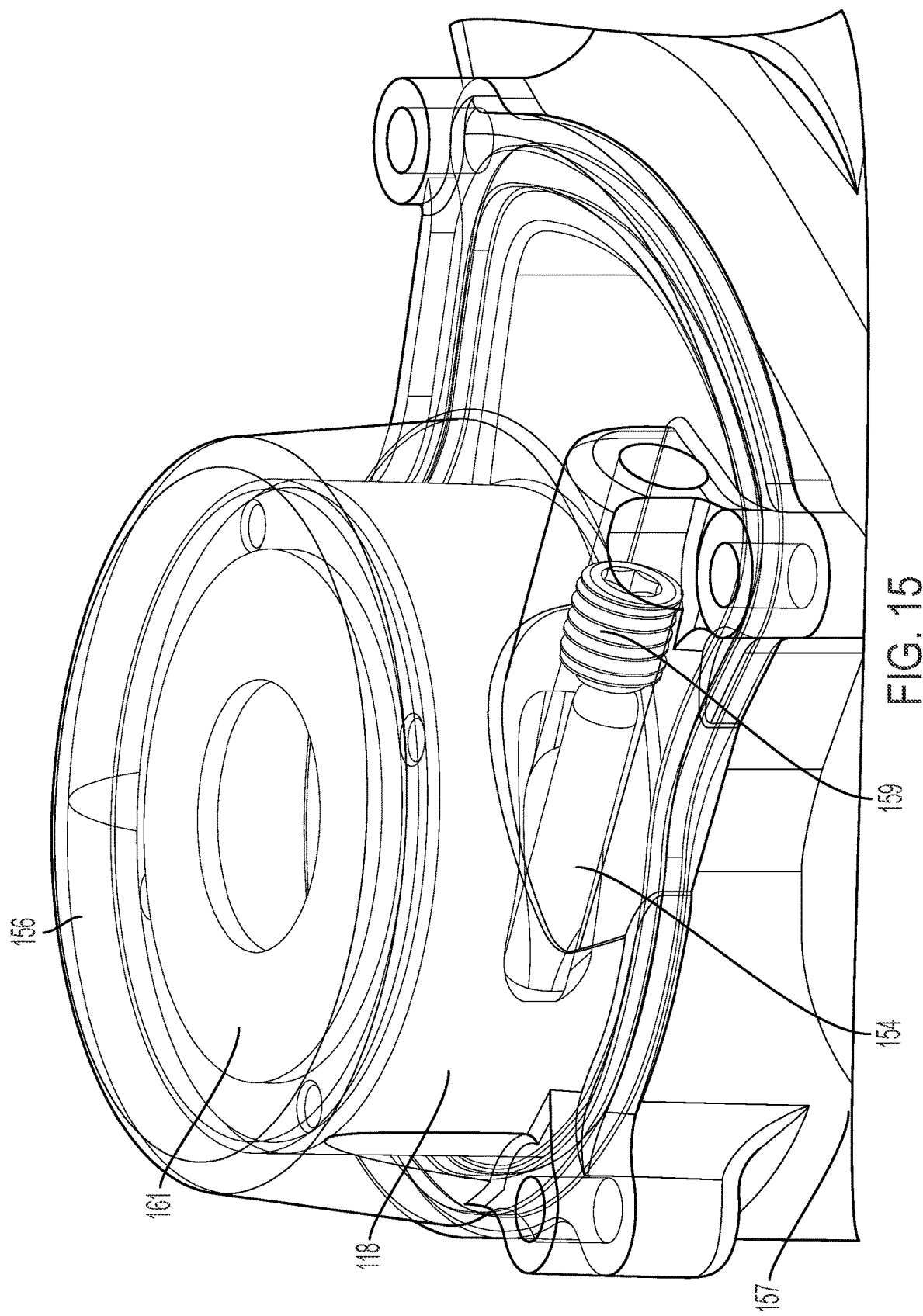

ELECTRIC POWERED GEAR ASSEMBLY FOR STEERING SYSTEM

CROSS-REFERENCE TO RELATED APPLICATIONS

This patent application claims the benefits of priority to U.S. Provisional Patent Application Ser. No. 63/158,986, filed Mar. 10, 2021, and U.S. Provisional Patent Application Ser. No. 63/257,677, filed Oct. 20, 2021, the disclosures of which are each incorporated by reference herein in their entireties.

FIELD OF THE INVENTION

The present disclosure relates to an electric powered gear assembly for steering systems and, more particularly, to an eccentric gear mesh sleeve assembly for such gear assemblies.

BACKGROUND

In certain vehicles, recirculating ball steering gears are utilized with electric power. This involves a mechanical system that uses power from an electric motor and amplifying the torque to interface with the steering linkage designs in current use.

Current integral gear systems employ the use of tapered teeth to delash the gear mesh of the sector teeth to the ball nut. This is done by tightening a nut on the sector shaft to draw the tapered sector teeth down into the ball nut teeth. The tapered teeth allow loads to be transmitted radially and axially into the sector gear shaft, thereby increasing the loading complexity of the design. The cutting of these tapered teeth is also very complex and limits design and manufacturing options. The current tapered tooth design also suffers from warranty related to tooth wear, which allows excessive gear lash that results in customer noise and rattle issues.

SUMMARY OF THE DISCLOSURE

According to one aspect of the disclosure, an electric powered recirculating ball assembly includes a shaft having a plurality of sector teeth extending therefrom. The assembly also includes an eccentric sleeve defining a bore containing a portion of the shaft, the eccentric sleeve comprising an upper sleeve segment and a lower sleeve segment that are separate components, the eccentric sleeve defining an opening that the sector teeth extend through.

According to another aspect of the disclosure, an eccentric sleeve assembly for a gear assembly is provided. The eccentric sleeve assembly includes an upper sleeve segment. The eccentric sleeve assembly also includes a lower sleeve segment that is an independent, separate relative to the upper sleeve segment.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 15 is a perspective view of an upper portion of the eccentric sleeve disposed within a sleeve housing and a cover.

DETAILED DESCRIPTION

Referring now to the Figures, where the invention will be described with reference to specific embodiments, without limiting same, disclosed are embodiments that delash an integral gear assembly in an electric power steering (EPS) system for a vehicle.

The following discussion is directed to various embodiments of the disclosure. Although certain embodiments are illustrated and/or described in more detail than others, the embodiments should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes. Often, these various steering schemes include an electric power steering (EPS) system that includes components such as steering wheel, column, rack-pinion gear, electric motor actuator, etc. The EPS system helps the operator to steer a vehicle by providing necessary assist torque. The assist torque is based on an operator's applied torque. In a steady-state sense, the operator torque and assist torque counter the cross link force generated because of tire-road interaction.

Although existing solutions have provided a certain amount of workability, improvements in power steering system design and adaptability continue to be of interest. Accordingly, systems and methods, such as those described herein, configured to provide improved packaging and operational framework of a power steering system, may be desirable. In some embodiments, the systems and methods described herein may be configured to provide improvements to the operational framework of the power steering system.

Figure 1:
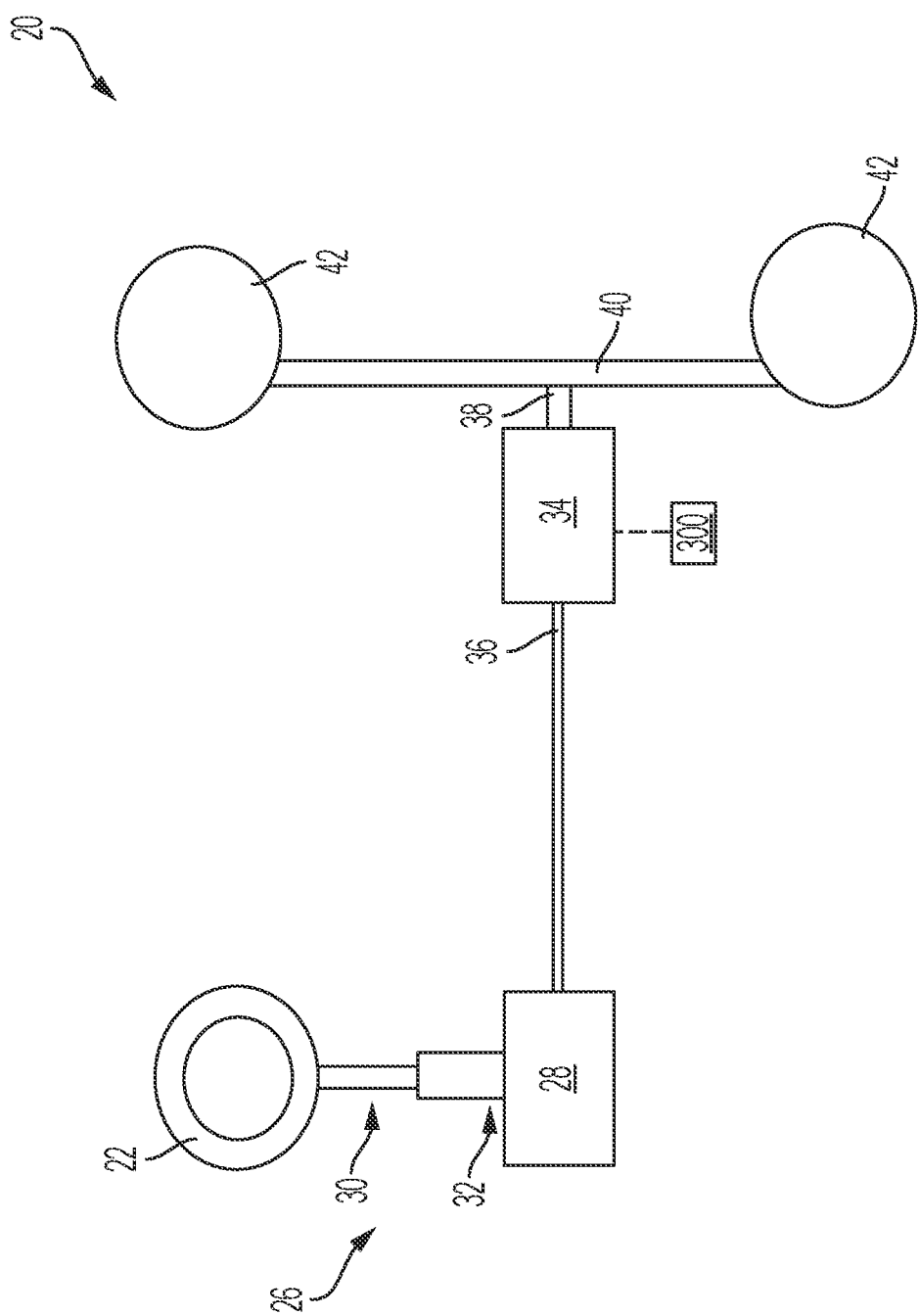
FIG. 1 is a schematic illustration of a power steering system.

Referring to FIG. 1, the power steering system 20 is generally illustrated. The power steering system 20 may be configured as a driver interface steering system, an autonomous driving system, or a system that allows for both driver interface and autonomous steering. The steering system may include an input device 22, such as a steering wheel or other handwheel actuator(s), wherein a driver may mechanically provide a steering input by turning the steering wheel. A steering column 26 extends along an axis from the input device 22 to an output assembly 28. The steering column 26 may include at least two axially adjustable parts, for example, a first portion 30 and a second portion 32 that are axially adjustable with respect to one another. The output assembly 28 may include a pinion shaft assembly, an I-shaft, a cardan joint, steer-by-wire components or any other features conventionally located opposite the input device 22. The output assembly 28 may connect to a power-assist assembly 34 (RWA) via a connection 36. The connection 36 may be one of a steering gear input shaft, a continuation of the pinion shaft assembly, or wired or wireless digital communication protocols. Behavior of the power-assist assembly 34 may be controlled via a control system 300.

The power-assist assembly 34 may include steering gear components 38 such as the recirculating ball-type steering gear disclosed herein (also referred to as "eRCB gear system"), driver-interface steering systems, or combinations thereof. The power-assist assembly 34 may then operably connect to a cross link 40 via the steering gear components 38. In operation, actuation of the driver input 22 causes a responsive movement of the power-assist assembly 34 and causes the cross link 40 to turn driving wheels 42 of an associated vehicle.

Figure 3:
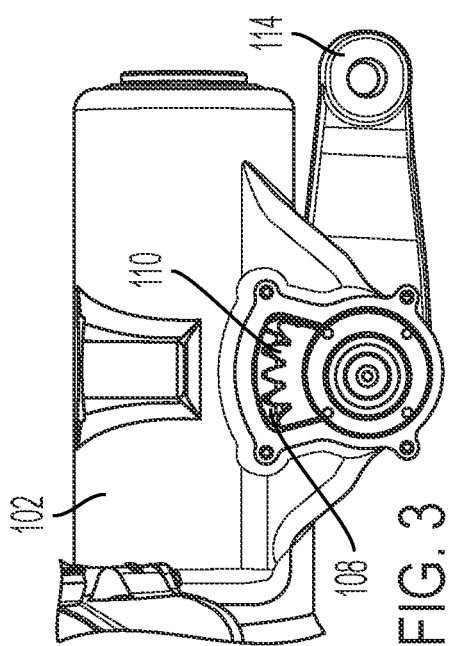
FIG. 3 is a plan view of a portion of the electric powered gear assembly with a housing assembled.
Figure 4:
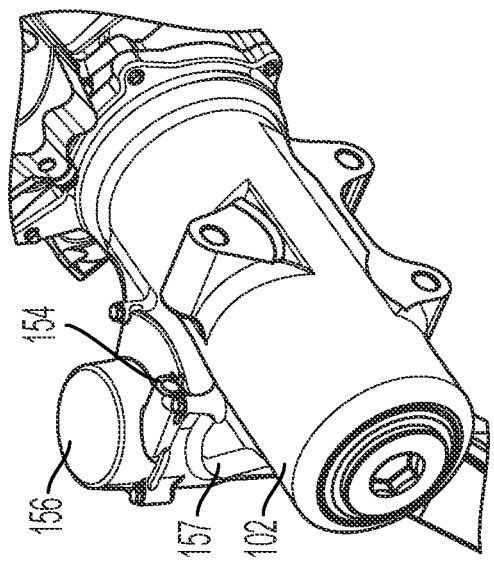
FIG. 4 is a perspective view of a portion of the electric powered gear assembly with a cover mechanically fastened thereto.
Figure 2:
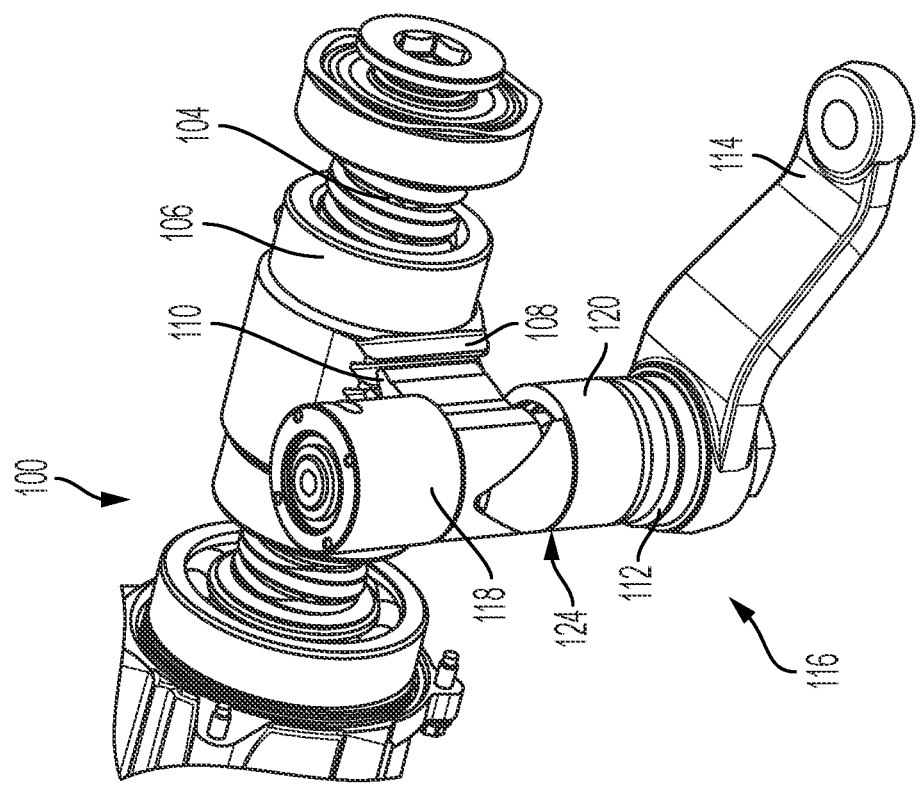
FIG. 2 is a perspective view of an electric powered gear assembly for the power steering system.

Referring now to FIGS. 2-4, an electric powered gear assembly 100 for the power steering system 20 is illustrated. The electric powered gear assembly 100 includes an electric motor 102. The electric motor 102 has an output shaft is operatively coupled to, or integrally formed with, a ball screw 104 that is rotatably driven by the electric motor 102 via the output shaft. A ball nut 106 is connected to the ball screw 104 and travels axially therealong during rotation of the ball screw 104. Ball nut teeth 108 on the ball screw 104 are engaged with sector teeth 110 which are integrally formed with a shaft 112. Movement of the ball nut 106 results in rotation of the pitman shaft 112. A pitman arm 114 is operatively coupled to the shaft 112 and rotates in response to rotation of the pitman shaft 112. The pitman shaft 112 is disposed within an eccentric sleeve 116.

The eccentric sleeve 116 is an assembly that is separated into two pieces. In particular, the eccentric sleeve 116 includes a first sleeve segment 118 and a second sleeve segment 120. Based on the illustrated orientation, the first sleeve segment 118 may be referred to as an upper sleeve segment 118 and the second sleeve segment 120 may be referred to as a lower sleeve segment 120. Separation of the eccentric sleeve 116 into two pieces allows for installation of the pitman shaft 112, while still providing other support components at interior locations of the eccentric sleeve 116, as described in detail herein.

Figure 6:
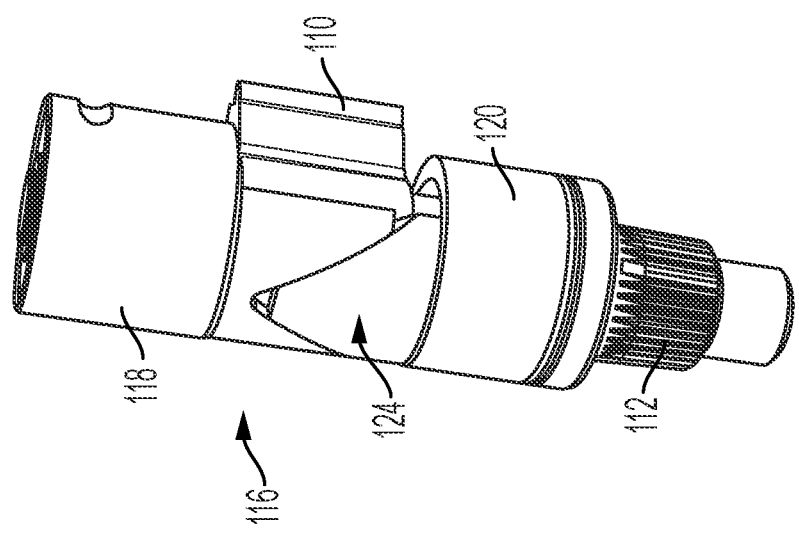
FIG. 6 is a second perspective view of the eccentric gear assembly of the electric powered gear assembly with the eccentric sleeve.
Figure 5:
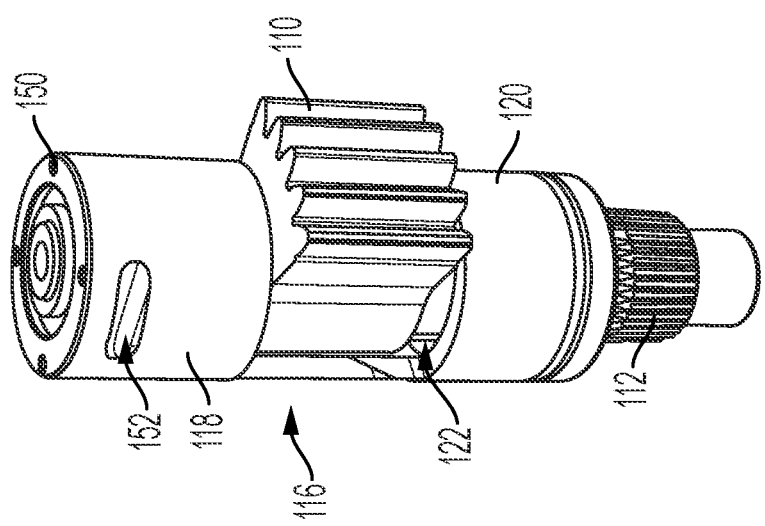
FIG. 5 is a first perspective view of an eccentric gear assembly of the electric powered gear assembly with an eccentric sleeve.

As shown in FIGS. 5 and 6, in an assembled condition of the first and second sleeve segments 118, 120, the eccentric sleeve 116 defines a window 122 for the sector teeth 110 to extend through. FIG. 6 illustrates an alignment feature 124 that positions the first and second sleeve segments 118, 120 relative to each other. The alignment feature 124 is a protrusion, such as a tooth or wedge shaped component, that extends from the first or second sleeve segment 118, 120, and is positioned within a receiving space of the other of the sleeve segment.

Figure 7:
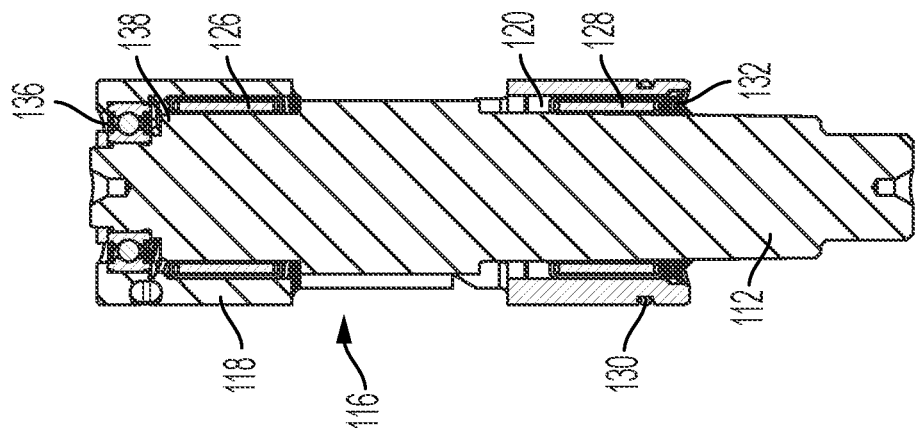
FIG. 7 is a cross-sectional view of the eccentric gear assembly.

FIG. 7 provides a cross-sectional view of the eccentric sleeve assembly 116 to illustrate the interior components. A first needle bearing set 126 is located between the first sleeve segment 118 and an outer surface of the pitman shaft 112, while a second needle bearing set 128 is located between the second sleeve segment 120 and the outer surface of the pitman shaft 112. The needle bearing sets 126, 128 allow for low friction rotation of the pitman shaft 112, but keeps the pitman shaft 112 in a desired position and orientation relative to other components by radially supporting the pitman shaft 112. In some embodiments, it is contemplated that bushings may be utilized instead of the needle bearing sets.

The eccentric sleeve 116 utilizes a ball bearing set 134 in the first sleeve segment 118 and a set of retaining rings 136, 138 to support the axial loading of the pitman shaft 112 to replace a standard lash adjuster bolt mechanism. This allows the needle bearing sets 126, 128 to support the full radial load of the system.

An O-ring 130 is positioned on the outer surface of the second sleeve segment 120 to seal the housing bore—which is defined by a sleeve housing 157 (FIG. 4)—which the eccentric sleeve 116 is disposed within, from contamination and a lip seal 132 is used for contamination prevention on the inner diameter to seal the pitman shaft 112. The lip seal 132 and O-ring 130 allow rotational setting and movement of the system but also provide a robust technique for sealing against contamination of the system.

Figure 10:
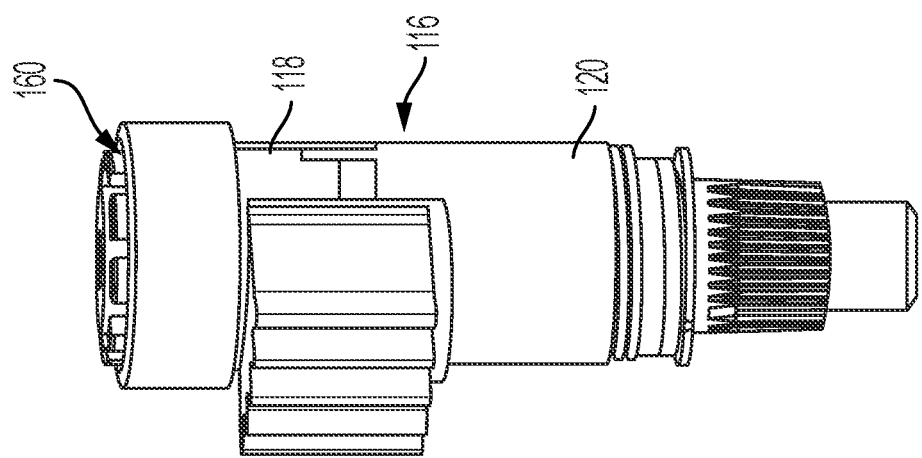
FIG. 10 is a perspective view of the eccentric gear assembly with the eccentric delash sleeve of FIG. 8.
Figure 9:
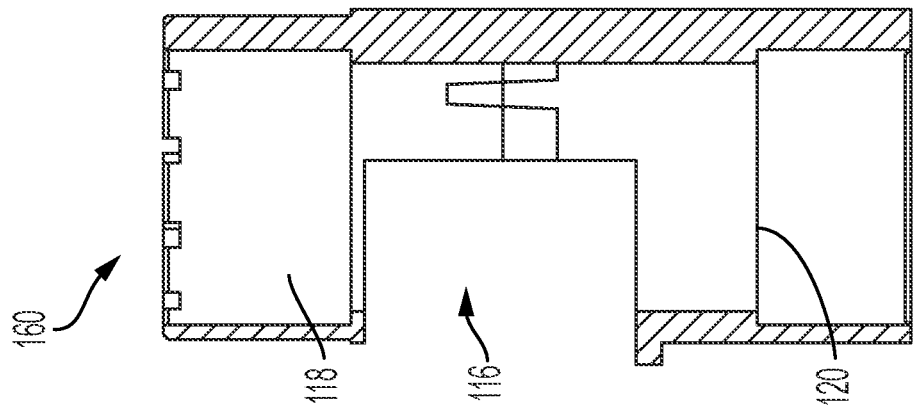
FIG. 9 is a cross-sectional view of the eccentric sleeve of FIG. 8.
Figure 8:
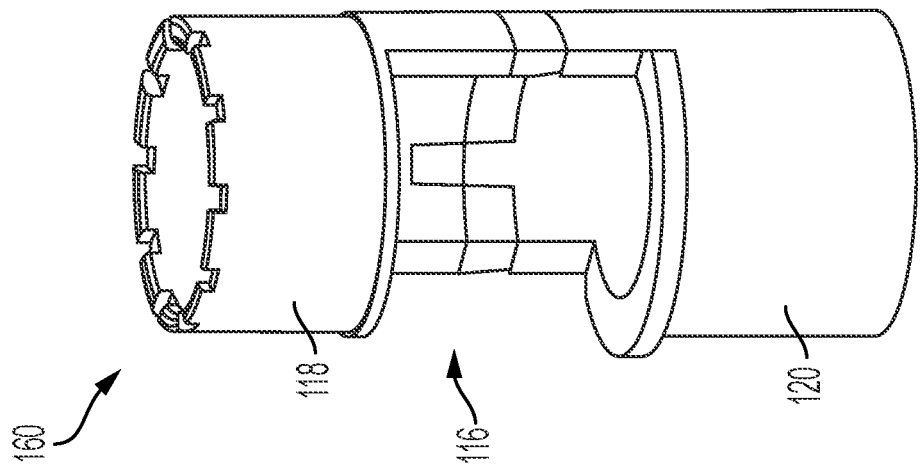
FIG. 8 is a perspective view of the eccentric sleeve according to another aspect of the disclosure.

Adjustment of the eccentric sleeve assembly 116 may be done in numerous contemplated manners. First, the top end of the first sleeve segment 118 may include one or more features, such as axial compression pockets 150 and/or a spherical pin pocket 152, as shown in FIG. 5. In such an embodiment, a spherical pin 154 may be inserted through an access hole of a cover 156 that is disposed on the top end of the first sleeve segment 118, as shown in FIG. 4. The cover 156 is mechanically fastened to the sleeve housing 157, such as with screws, bolts or the like. The upper sleeve segment 118 is able to rotate relative to the sleeve housing 157 and to the cover 156 to allow adjustment of the sleeve segments 118, 120, such as with the spherical pin 154. Alternatively, adjustment of the eccentric sleeve assembly 116 may be facilitated by drive features 160 that are cut or formed on the top end of the first sleeve segment 118, as shown in FIGS. 8-10.

Referring to FIG. 15, an upper portion of the upper sleeve segment 118 is shown within the sleeve housing 157 and the cover 156, with the cover 156 transparent to illustrate the interior components for an embodiment with a spherical pin 154. In particular, the pin 154 is disposed within the access hole of the cover 156 and is pressed on with a set screw 159 to retain it within the pin pocket 152 of the upper sleeve segment 118. FIG. 15 also illustrates a preloading member 161 disposed between the upper end of the upper sleeve segment 118 and the cover 156 to prevent the pitman shaft and eccentric sleeve segments 118, 120 from rattling within the sleeve housing 157 along the axis of the pitman shaft 112. The preloading member 161 is a disc spring in the illustrated embodiment, but it is contemplated that other structures may be utilized, such as a crush ring or a helical compression spring, for example.

The eccentric movement of the pitman shaft 112 is used to delash the sector gear mesh and allows the elimination of the current tapered tooth design. If the system is a non-active delash design, then pins are used to embed into the cover to lock the rotation of the eccentric 116 after it is set. Because of this it allows a simpler and cheaper spur tooth design to be feasible. Alternatively, in a non-active delash design, the system can also be locked in place by adjusting the spherical pin position in the outside pocket. In this case, pins in the cover 156 would not be required.

Figure 12:
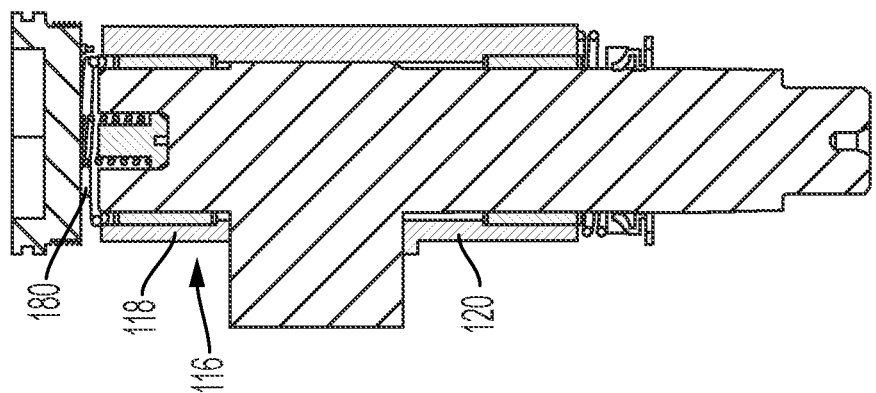
FIG. 12 is a cross-sectional view of the eccentric gear assembly according to another aspect of the disclosure.

Any of the embodiments disclosed herein allow the loading to be separated so the gear separating loads only act radially instead of both radially and axially, as in current integral gear designs. As an alternative to the non-active delash embodiments with the pins described above, some embodiments allow an active delash concept to be introduced with a compensation mechanism, such as a one-directional clutch bearing 170 (FIG. 11) or a constant tension torsional spring 180 (FIG. 12). This allows the gear mesh to compensate for wear during the life of the product and improve the warranty related to gear mesh noise and rattle. In such embodiments, the compensation mechanism is provided along the spherical pin 154 axis. For example, a spring or another mechanization that tightens the eccentric sleeve over time by rotation may be utilized.

Figure 11:
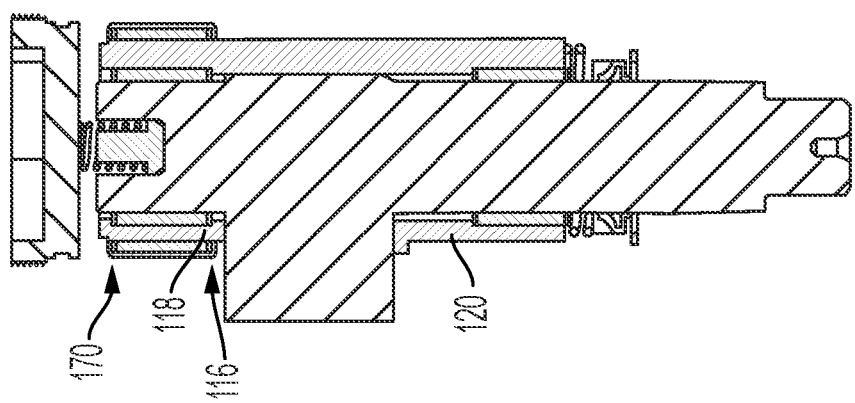
FIG. 11 is a cross-sectional view of the eccentric gear assembly according to another aspect of the disclosure.

The clutch bearing of FIG. 11 is a bearing on the outside of the delash sleeve. This may be placed either above or below the sector teeth. The inner race ramps of the bearing are adjusted to allow a set range of reverse movement. This allows the eccentric sleeve to tighten the mesh after a set amount of lash is available between the sector teeth. The lash range can be tuned based on the application of use. The torsional spring of FIG. 12 is connected between the delash sleeve and the housing to apply a constant load for additional delash during wear.

Figure 14:
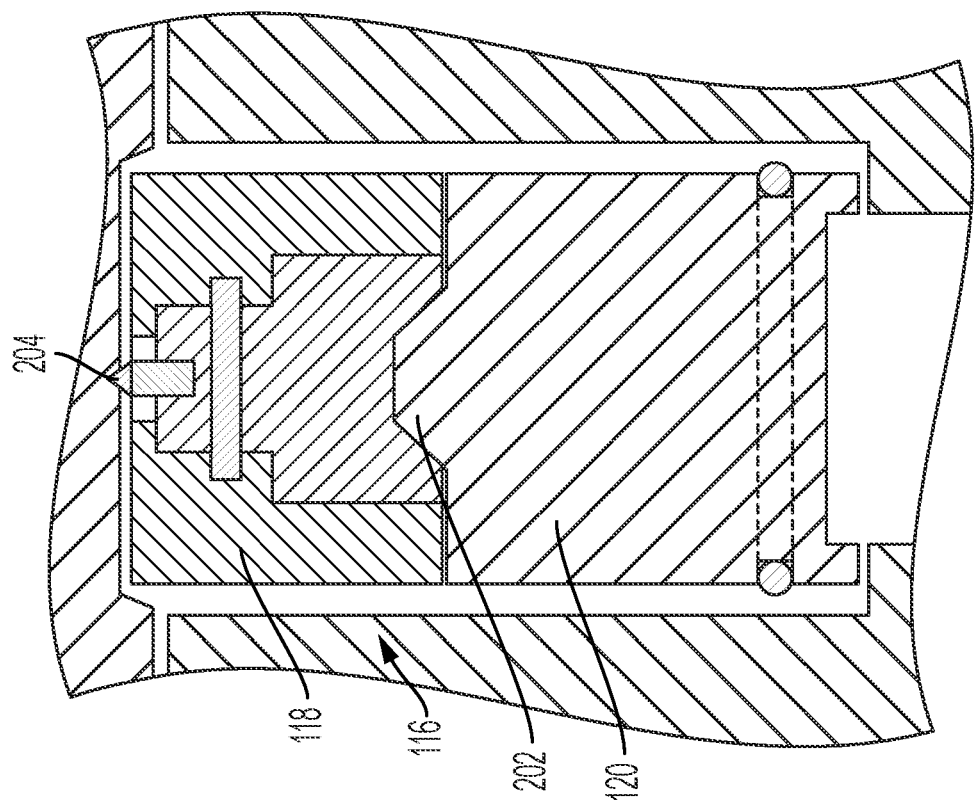
FIG. 14 is an enlarged, cross-sectional view of a portion of the eccentric gear assembly of FIG. 13.
Figure 13:
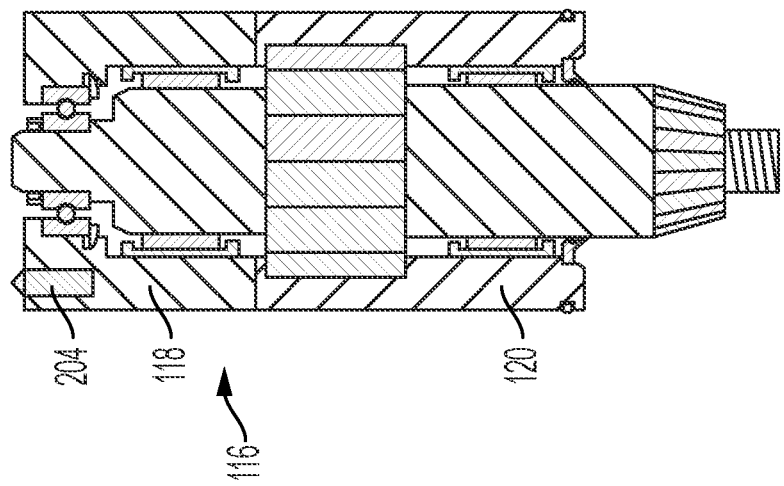
FIG. 13 is a cross-sectional view of the eccentric gear assembly according to another aspect of the disclosure.

FIGS. 13 and 14 illustrate the two-piece eccentric delash sleeve according to another disclosed embodiment. As with the above-described embodiments, the sleeve comprises an upper sleeve portion and a lower sleeve portion. As with the prior embodiments of FIGS. 2-7, the eccentric sleeve 116 creates a "cartridge" type pitman assembly for the steering system. The upper and lower sleeve segments 118, 120 are coupled together with an interlock feature 202 to allow setting of the proper position and uses a dowel pin 204, staking or compression approach from the top of the upper sleeve segment 118 to the bottom of the lower sleeve segment 120 to apply an axial load to lock the eccentric sleeve 116 into position after being set. In some embodiments, the interlock feature 202 is a tapered tooth, for example.

The embodiments disclosed herein simplify and reduce the complexity of a current eRCB gear system. This design also allows most of the decoupling of radial and axial loads of the system to be independently handled by different bearings and greatly improves the complexity of the design to provide cost savings and improves ease of manufacturing and assembly. Additionally, the eccentric sleeve 116 eliminates the need for a tapered sector tooth design and allows the use of a standard spur tooth design reducing the cost and complexity of the current system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric powered recirculating ball assembly comprising:
   a shaft having a plurality of sector teeth extending therefrom;
   an eccentric sleeve defining a bore containing a portion of the shaft, the eccentric sleeve comprising an upper sleeve segment and a lower sleeve segment that are separate components, the eccentric sleeve defining an opening that the sector teeth extend through;
   a male interlock feature on one of the upper sleeve segment and the lower sleeve segment; and
   a female interlock feature on the other of the upper sleeve segment and the lower sleeve segment, wherein the male interlock feature and the female interlock feature position the sleeve segments relative to each other.

2. The electric powered recirculating ball assembly of claim 1, wherein the male interlock feature is a tapered tooth and the female interlock feature is a recess configured to receive the tapered tooth.

3. The electric powered recirculating ball assembly of claim 1, further comprising:
   an upper needle bearing set disposed within the bore between the upper sleeve segment and the shaft; and
   a lower needle bearing set disposed within the bore between the lower sleeve segment and the shaft, wherein the upper needle bearing set and the lower needle bearing set radially support the shaft.

4. The electric powered recirculating ball assembly of claim 1, further comprising a lip seal disposed between the lower sleeve segment and the shaft.

5. The electric powered recirculating ball assembly of claim 1, further comprising an O-ring disposed within a groove on an outer surface of the lower sleeve segment.

6. The electric powered recirculating ball assembly of claim 1, further comprising a sealing member disposed on an outer surface of the lower sleeve segment.

7. The electric powered recirculating ball assembly of claim 1, further comprising a bearing set disposed within the bore between the upper sleeve segment and the shaft to axially support the shaft.

8. An electric powered recirculating ball assembly comprising:
   a shaft having a plurality of sector teeth extending therefrom;
   an eccentric sleeve defining a bore containing a portion of the shaft, the eccentric sleeve comprising an upper sleeve segment and a lower sleeve segment that are separate components, the eccentric sleeve defining an opening that the sector teeth extend through
   a pin pocket defined along an outer surface of the upper sleeve segment;
   a cover disposed on an upper end of the upper sleeve segment and mechanically fastened to a sleeve housing; and a pin extending through the cover and into the pin pocket to adjust the position of the eccentric sleeve.

9. The electric power recirculating ball assembly of claim 8, further comprising a preloading member disposed between the upper end of the upper sleeve segment and the cover to prevent the sleeve segments from rattling within the sleeve housing.

10. The electric powered recirculating ball assembly of claim 1, further comprising a pin extending from one of the upper and lower sleeve segments to facilitate application of an axial load to lock the electric powered recirculating ball assembly into a desired position.

11. The electric powered recirculating ball assembly of claim 1, wherein the sector teeth are engaged with teeth of a ball nut axially moveable along a ball screw that is rotatably driven by an electric motor.

12. An electric powered recirculating ball assembly comprising:
    a shaft having a plurality of sector teeth extending therefrom;
    an eccentric sleeve defining a bore containing a portion of the shaft, the eccentric sleeve comprising an upper sleeve segment and a lower sleeve segment that are separate components, the eccentric sleeve defining an opening that the sector teeth extend through; and
    a one-directional clutch bearing located on an outer surface of the eccentric sleeve.

13. An electric powered recirculating ball assembly comprising:
    a shaft having a plurality of sector teeth extending therefrom;
    an eccentric sleeve defining a bore containing a portion of the shaft, the eccentric sleeve comprising an upper sleeve segment and a lower sleeve segment that are separate components, the eccentric sleeve defining an opening that the sector teeth extend through; and
    a torsion spring disposed on an upper end of the upper sleeve segment and between the upper sleeve segment and a sleeve housing.

14. An eccentric sleeve assembly for a gear assembly, the eccentric sleeve assembly comprising:
    an upper sleeve segment;
    a lower sleeve segment that is an independent, separate relative to the upper sleeve segment;
    an upper needle bearing set disposed along an inner surface of the upper sleeve segment;
    a lower needle bearing set disposed along an inner surface of the lower sleeve segment; and
    a bearing set disposed along an inner surface of the upper sleeve segment.

15. The eccentric sleeve assembly of claim 14, further comprising:
    a pin pocket defined along an outer surface of the upper sleeve segment;
    a cover disposed on an upper end of the upper sleeve segment and mechanically fastened to a sleeve housing; and
    a pin extending through the cover and into the pin pocket.

16. An eccentric sleeve assembly for a gear assembly, the eccentric sleeve assembly comprising:
    an upper sleeve segment;
    a lower sleeve segment that is an independent, separate relative to the upper sleeve segment; and
    a one-directional clutch bearing located on an outer surface of the eccentric sleeve assembly.

17. An eccentric sleeve assembly for a gear assembly, the eccentric sleeve assembly comprising:
    an upper sleeve segment;
    a lower sleeve segment that is an independent, separate relative to the upper sleeve segment; and
    a torsion spring disposed on an upper end of the upper sleeve segment and between the upper sleeve segment and a sleeve housing.

\* \* \* \* \*